United States Patent
Hu et al.

(10) Patent No.: US 11,609,108 B2
(45) Date of Patent: Mar. 21, 2023

(54) SENSOR ENCLOSURE DRAINAGE

(71) Applicant: Pony AI Inc., Grand Cayman (KY)

(72) Inventors: Zhongnan Hu, Palo Alto, CA (US); Zuoteng Chen, San Jose, CA (US); Nengxiu Deng, Fremont, CA (US); Cheng Jin, Fremont, CA (US); Kai Chen, San Jose, CA (US); Yubo Zhang, Los Gatos, CA (US); Xiang Yu, Santa Clara, CA (US); Tiancheng Lou, Milpitas, CA (US); Jun Peng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 458 days.

(21) Appl. No.: 16/749,292

(22) Filed: Jan. 22, 2020

(65) Prior Publication Data
US 2021/0223070 A1    Jul. 22, 2021

(51) Int. Cl.
| | | |
|---|---|---|
| *G01D 11/24* | (2006.01) | |
| *G01D 11/26* | (2006.01) | |
| *B60R 11/04* | (2006.01) | |
| *G01S 17/931* | (2020.01) | |
| *G01W 1/14* | (2006.01) | |
| *B60R 11/00* | (2006.01) | |

(52) U.S. Cl.
CPC .......... *G01D 11/245* (2013.01); *B60R 11/04* (2013.01); *G01D 11/26* (2013.01); *G01S 17/931* (2020.01); *G01W 1/14* (2013.01); *B60R 2011/005* (2013.01); *B60R 2011/0092* (2013.01)

(58) Field of Classification Search
CPC ......... B60R 2011/004; B60R 2300/105; B60R 11/04; B60R 2300/8093; B60R 2300/804; B60R 2300/8066; B60R 2300/8086; B60R 2300/8033
USPC .......................................................... 73/431
See application file for complete search history.

(56) References Cited

U.S. PATENT DOCUMENTS

| | | | |
|---|---|---|---|
| 3,551,684 A | * | 12/1970 | Burton .................... F21V 23/04 362/253 |
| 4,672,366 A | | 6/1987 | Butts |
| 7,552,632 B2 | | 6/2009 | Runge |

(Continued)

FOREIGN PATENT DOCUMENTS

| | | | | |
|---|---|---|---|---|
| CN | 107672538 A | * | 2/2018 | ............. B60R 11/00 |
| CN | 108679419 A | * | 10/2018 | |

(Continued)

OTHER PUBLICATIONS

International Search Report and Written Opinion for PCT/US2019/054266 dated Nov. 4, 2019, 7 pages.

*Primary Examiner* — David A. Rogers
(74) *Attorney, Agent, or Firm* — Sheppard Mullin

(57) ABSTRACT

A sensor enclosure comprises a cover and a structure. The structure can be encased by the cover. The structure comprises a frame, a ring, and one or more anchoring posts. The frame can be configured to mount one or more sensors. The ring, disposed peripherally to the frame, can be operatively coupled to the cover. The ring can include a drainage ring plate that drains rainwater accumulated on the cover away from the sensor enclosure. The one or more anchoring posts, disposed underneath the frame and the ring, can be used to anchor the sensor enclosure to a vehicle.

20 Claims, 10 Drawing Sheets

(56) References Cited

U.S. PATENT DOCUMENTS

| | | | |
|---|---|---|---|
| 7,697,028 B1* | 4/2010 | Johnson | G08B 13/19619 348/148 |
| 8,567,963 B1* | 10/2013 | Criscuolo | G02B 27/0006 359/507 |
| 8,620,480 B2 | 12/2013 | Alexanian | |
| 9,329,078 B1* | 5/2016 | Mundhenke | G05D 1/0238 |
| 9,731,688 B2* | 8/2017 | Doorley | B60S 1/44 |
| 10,277,825 B2* | 4/2019 | Wang | B60R 11/04 |
| 10,286,880 B2* | 5/2019 | Schmidt | B60R 16/08 |
| 10,549,726 B2* | 2/2020 | Garcia Crespo | G02B 27/0006 |
| 10,578,716 B1* | 3/2020 | Hu | G01S 13/931 |
| 10,589,724 B2* | 3/2020 | Krishnan | B60S 1/0822 |
| 10,649,317 B2* | 5/2020 | Thomas | G03B 17/08 |
| 10,768,063 B1* | 9/2020 | Diehl | G01S 7/497 |
| 10,782,520 B2* | 9/2020 | Crespo | H04N 5/2252 |
| 10,912,182 B2* | 2/2021 | Han | H05H 1/2406 |
| 10,933,842 B2* | 3/2021 | Gilbertson | H04N 5/2251 |
| 11,097,695 B2* | 8/2021 | Richardson | G02B 27/0006 |
| 11,181,619 B2* | 11/2021 | Toth | H04N 5/23238 |
| 11,192,527 B2* | 12/2021 | Fan | G02B 27/0006 |
| 11,247,616 B2* | 2/2022 | Boswell | B60R 11/04 |
| 11,279,324 B2* | 3/2022 | Gilbertson | B60S 1/28 |
| 2006/0230570 A1* | 10/2006 | Parris | B60S 1/56 15/250.41 |
| 2009/0039901 A1 | 2/2009 | Delatte | |
| 2012/0272726 A1 | 11/2012 | Cullen | |
| 2013/0104933 A1* | 5/2013 | Aldred | G03B 17/561 134/6 |
| 2014/0293263 A1 | 10/2014 | Justice et al. | |
| 2014/0347440 A1* | 11/2014 | Hatcher | H04N 5/2252 348/36 |
| 2016/0282468 A1 | 9/2016 | Gruver | |
| 2017/0028936 A1* | 2/2017 | Matsumoto | G03B 17/08 |
| 2017/0151933 A1 | 6/2017 | Doorley | |
| 2017/0176576 A1 | 6/2017 | Kotelnikov et al. | |
| 2018/0015907 A1* | 1/2018 | Rice | B60S 1/56 |
| 2018/0113331 A1 | 4/2018 | Wang | |
| 2018/0370500 A1 | 12/2018 | Garcia Crespo | |
| 2021/0061186 A1* | 3/2021 | Nishiyama | H04N 5/2254 |
| 2021/0162958 A1* | 6/2021 | Kim | G03B 17/561 |
| 2021/0280028 A1* | 9/2021 | Levy | G06V 40/173 |
| 2021/0293932 A1* | 9/2021 | Bruce-Wen | G01S 17/08 |
| 2021/0302541 A1* | 9/2021 | Fields | H05K 7/14 |
| 2022/0196801 A1* | 6/2022 | Robertson, Jr. | G01S 17/931 |

FOREIGN PATENT DOCUMENTS

| | | | | |
|---|---|---|---|---|
| CN | 110167688 A | * | 8/2019 | B08B 17/02 |
| CN | 108944953 B | * | 1/2020 | B60R 11/00 |
| CN | 111252010 A | * | 6/2020 | B60R 11/02 |
| KR | 20110008126 A | * | 1/2011 | B60Q 1/2611 |

* cited by examiner

SENSOR ENCLOSURE DRAINAGE

CROSS-REFERENCE TO RELATED APPLICATION

This application is a continuation of U.S. application Ser. No. 16/150,952 filed Oct. 3, 2018. The entire disclosure of which is incorporated herein by reference.

FIELD OF THE INVENTION

This disclosure relates to an enclosure for encasing sensors associated with autonomous vehicles. More particularly, the present disclosure relates to a structure of the enclosure that drains rainwater away from the enclosure.

BACKGROUND

In general, autonomous vehicles rely on myriad of information obtained from sensors to determine operations to be taken next (e.g., turning, accelerating, breaking, etc.). Such sensors can include light detection and ranging sensors (LiDARs), cameras, and radars, to name some examples. Often, these sensors are mounted exteriorly to an autonomous vehicle. Such a configuration can be undesirable because it exposes the sensors to harsh environmental conditions (e.g., temperature swing, radiation, oxidation, etc.), and thereby may prematurely shorten a sensor's lifetime. Furthermore, mounting the sensors exteriorly to the autonomous vehicle can subject the sensors to an increased risk of impact or damage from road debris. To alleviate these and other problems, a sensor enclosure may be utilized such that the sensors can be encased in the sensor enclosure. The sensor enclosure can offer additional protection against environmental elements and road debris while still allowing the encased sensors to function or operate. However, encasing sensors in a sensor enclosure can create other challenges. For example, while driving in rain or snow, an outer surface of the sensor enclosure may collect rainwater (or melted snow). The rainwater can accumulate and flow down from the outer surface to a base or bottom of the sensor enclosure. The rainwater can seep into the sensor enclosure from the base and can potentially cause water damage to the encased sensors. These shortfalls are addressed by the present disclosure.

SUMMARY

Described herein are a sensor enclosure that drains rainwater accumulated on an outer surface of the sensor enclosure away from the sensor enclosure, and a method of operating the sensor enclosure.

In one embodiment, the present disclosure describes a sensor enclosure comprises a cover and a structure. The structure can be encased by the cover. The structure comprises a frame, a ring, and one or more anchoring posts. The frame can be configured to mount one or more sensors. The ring, disposed peripherally to the frame, can be operatively coupled to the cover. The ring can include a drainage ring plate that drains rainwater accumulated on the cover away from the sensor enclosure. The one or more anchoring posts, disposed underneath the frame and the ring, can be used to anchor the sensor enclosure to a vehicle.

In some embodiments, the drainage ring plate can include one or more drainage holes through which the rainwater accumulated on the cover flows down from the cover and out through the one or more drainage holes.

In some embodiments, the drainage ring plate can further include anchoring post mounting points through which a first subset of the one or more anchoring posts can be attached.

In some embodiments, the cover can be made of material transparent to wavelengths of light receptive to the one or more sensors.

In some embodiments, the cover can be made of at least one of acrylic glass, strengthened glass, or safety glass.

In some embodiments, the acrylic glass can be at least one of Cylux, Plexiglas, Acrylite, Lucite, or Perspex.

In some embodiments, the safety glass can be laminated glass held in place by layers of polyvinyl butyral or ethylene-vinyl acetate.

In some embodiments, the cover can be selectively coated with a thin-film neutral filter to alter a transmittance to light through the cover.

In some embodiments, the cover can be selectively coated with a thin-film graduated neutral filter to alter a transmittance to light through the cover along an axis.

In some embodiments, the cover can be coated with a reflective coating.

In some embodiments, the frame can comprise an upper base plate providing a mounting surface for at least one LiDAR, a lower base plate providing a mounting surface for one or more cameras, and one or more structs to hold the upper base plate and the lower base plate together.

In some embodiments, the lower base plate can further provide anchoring post mounting points through which a second subset of the one or more anchoring posts can be attached.

In some embodiments, the frame can further comprise a rainwater sensor configured to detect a presence of rainwater on the cover, and a powertrain configured to rotate the ring and the cover coupled to the ring.

In some embodiments, the powertrain can comprise an electric motor coupled to a drivetrain.

In some embodiments, the drivetrain can comprise one or more gears.

In some embodiments, the powertrain can rotate the cover to tangentially spin-away a portion of the rainwater accumulated on the cover.

In some embodiments, the frame, the ring, and the one or more anchoring posts can be fabricated with at least one of aluminum alloy, steel alloy, or carbon graphite.

In some embodiments, the frame, the ring, and the one or more anchoring posts can be fabricated using three dimensional printers with thermoplastics.

In some embodiments, the thermoplastics can include at least one of polylactic acid, acrylonitrile butadiene styrene, polyamide, high impact polystyrene, or thermoplastic elastomer.

These and other features of the apparatus disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the inventions.

BRIEF DESCRIPTION OF THE DRAWINGS

Certain features of various embodiments of the present inventions are set forth with particularity in the appended claims. A better understanding of the features and advantages of the inventions will be obtained by reference to the following detailed description that sets forth illustrative embodiments, in which the principles of the invention are utilized, and the accompanying drawings of which:

Figure 1A:
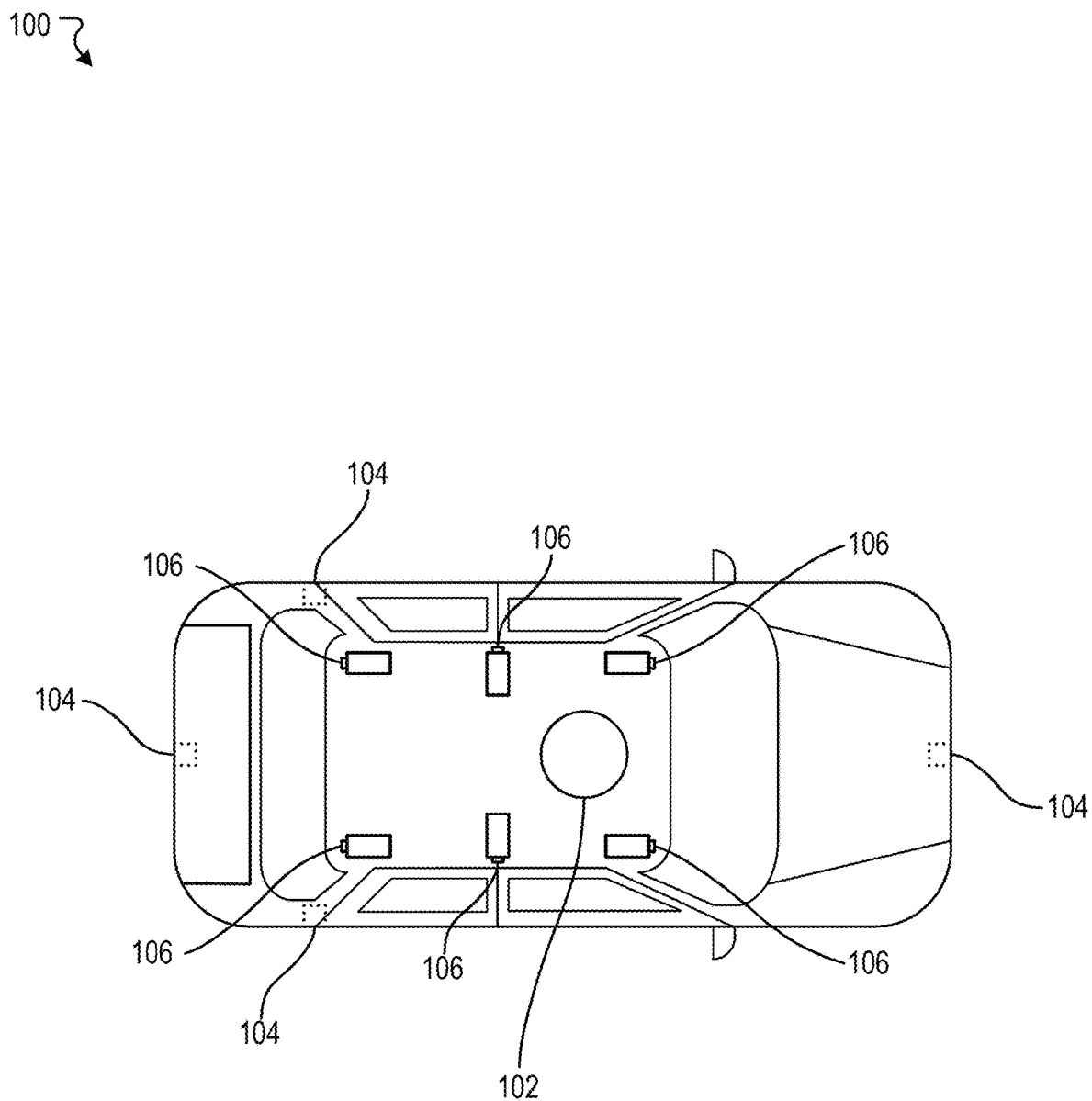
FIG. 1A illustrates an example autonomous vehicle, according to an embodiment of the present disclosure.

The figures depict various embodiments of the disclosed apparatus for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

An autonomous vehicle is equipped with complex sensors, data acquisition systems, actuation systems, and computing systems to enable the autonomous vehicle to operate without human involvement. These sensors can include light detection and ranging sensors (LiDARs), cameras, and radars, to name some examples. Often, the sensors are mounted exteriorly to the autonomous vehicle. Such a configuration is not ideal because mounting the sensors exteriorly expose the sensors to harsh environmental conditions (e.g., temperature swings, radiation, oxidation, etc.). These harsh conditions can prematurely shorten a sensor's lifetime. Furthermore, this configuration subjects the sensors to an increased risk of impact or damage from road debris. It is therefore desirable to encase the sensors in a sensor enclosure that provides an additional protection against environmental conditions, as well as, potential impacts from road debris.

Although the sensor enclosure can provide additional protection for the sensors, the sensor enclosure may also create other challenges. For example, while driving under raining or snowing conditions, an outer surface of the sensor enclosure can collect rainwater (or melted snow). The rainwater can accumulate and flow down from the outer surface to a base or bottom of the sensor enclosure. The rainwater can be trapped in various crevices at the base and, in some cases, can seep into the sensor enclosure, through the crevices, and cause potential water damage to the encased sensors and/or electronics.

A claimed sensor enclosure overcomes problems specifically discussed above. In various embodiments, a sensor enclosure comprises a cover and a structure. The structure can be encased by the cover. The structure comprises a frame, a ring, and one or more anchoring posts. The frame can be configured to mount one or more sensors. The ring, disposed peripherally to the frame, can be operatively coupled to the cover. The ring can include a drainage ring plate that drains rainwater accumulated on the cover away from the sensor enclosure. The one or more anchoring posts, disposed underneath the frame and the ring, can be used to anchor the sensor enclosure to a vehicle. Further details of the cover, the structure, and the sensor enclosure will be discussed herein.

FIG. 1A illustrates an example autonomous vehicle 100, according to an embodiment of the present disclosure. An autonomous vehicle 100 generally refers to a category of vehicles that are capable of sensing and driving in an environment by itself. The autonomous vehicle 100 can include myriad of sensors (e.g., LiDARs, cameras, radars, etc.) to detect and identify objects in an environment. Such objects may include, but not limited to, pedestrians, road signs, traffic lights, and/or other vehicles, for example. The autonomous vehicle 100 can also include myriad of actuators to propel the autonomous vehicle 100 navigate around the environment. Such actuators may include, for example, any suitable electro-mechanical devices or systems to control a throttle response, a braking action, a steering action, etc. In some embodiments, the autonomous vehicle 100 can recognize, interpret, and comprehend road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust a speed at which the autonomous vehicle 100 is traveling in relation to other objects in the environment. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on a conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include laser scanning systems (e.g., LiDARs) 102, radars 104, cameras 106, and/or the like. The one or more sensors allow the autonomous vehicle 100 to sense an environment around the autonomous vehicle 100. For example, the LiDARs 102 can generate a three dimensional map of the environment. The LiDARs 102 can also detect objects in the environment. In another example, the radars 104 can determine distances and speeds of objects around the autonomous vehicle 100. In another example, the cameras 106 can capture and process image data to detect and identify objects, such as road signs, as well as deciphering content of the objects, such as speed limit posted on the road signs.

In the example of FIG. 1A, the autonomous vehicle 100 is shown with a LiDAR 102 coupled to a roof or a top of the autonomous vehicle 100. The LiDAR 102 can be configured to generate three dimensional maps of an environment and detect objects in the environment. In the example of FIG. 1A, the autonomous vehicle 100 is shown with four radars 104. Two radars are coupled to a front-side and a back-side of the autonomous vehicle 100, and two radars are coupled to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. In another example, if the vehicle ahead experiences a suddenly reduction in speed, the autonomous vehicle 100 can detect this sudden change in motion and adjust its vehicle speed accordingly. In some embodiments, the right-side and the left-side radars can be configured for blind-spot detection. In the example of FIG. 1A, the autonomous vehicle 100 is shown with six cameras 106. Two cameras are coupled to the front-side of the autonomous vehicle 100, two cameras are coupled to the back-side of the autonomous vehicle 100, and two cameras are couple to the right-side and the left-side of the autonomous vehicle 100. In some embodiments, the front-side and the back-side cameras can be configured to detect, identify, and decipher objects, such as cars, pedestrian, road signs, in the front and the back of the autonomous vehicle 100. For example, the front-side cameras can be utilized by the autonomous vehicle 100 to determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
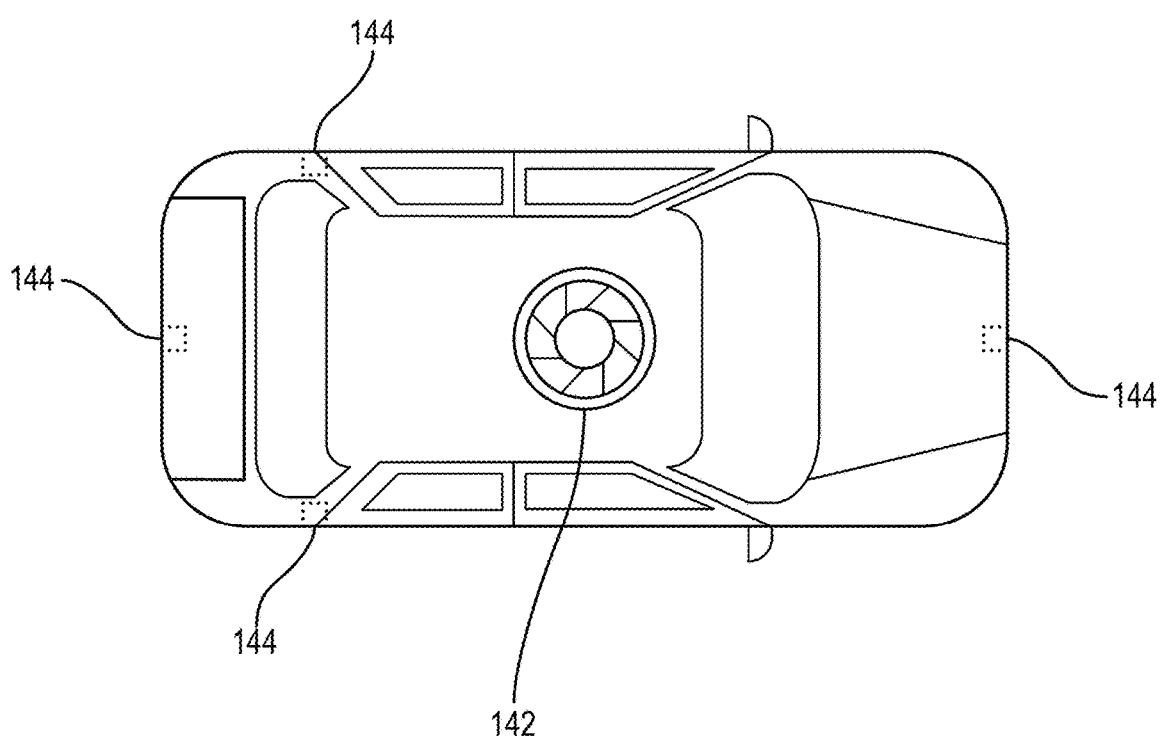
FIG. 1B illustrates an example autonomous vehicle, according to an embodiment of the present disclosure.

FIG. 1B illustrates an example autonomous vehicle 140, according to an embodiment of the present disclosure. In the example of FIG. 1B, the autonomous vehicle 140 is shown with a sensor enclosure 142 and four radars 144. The sensor enclosure 142 can include a LiDAR and one or more camera. As discussed, the sensor enclosure 142 can provide an additional protection for the LiDAR and the one or more cameras against various environmental conditions while still allowing wavelengths of light receptive to the LiDAR and the one or more cameras to enter. In general, the LiDAR and the one or more cameras of the sensor enclosure 142 and the four radars work exactly same as the LiDAR, cameras, and radars discussed with respect with FIG. 1A. The sensor enclosure 142 will be discussed in further detail with references to FIG. 2A.

Figure 2A:
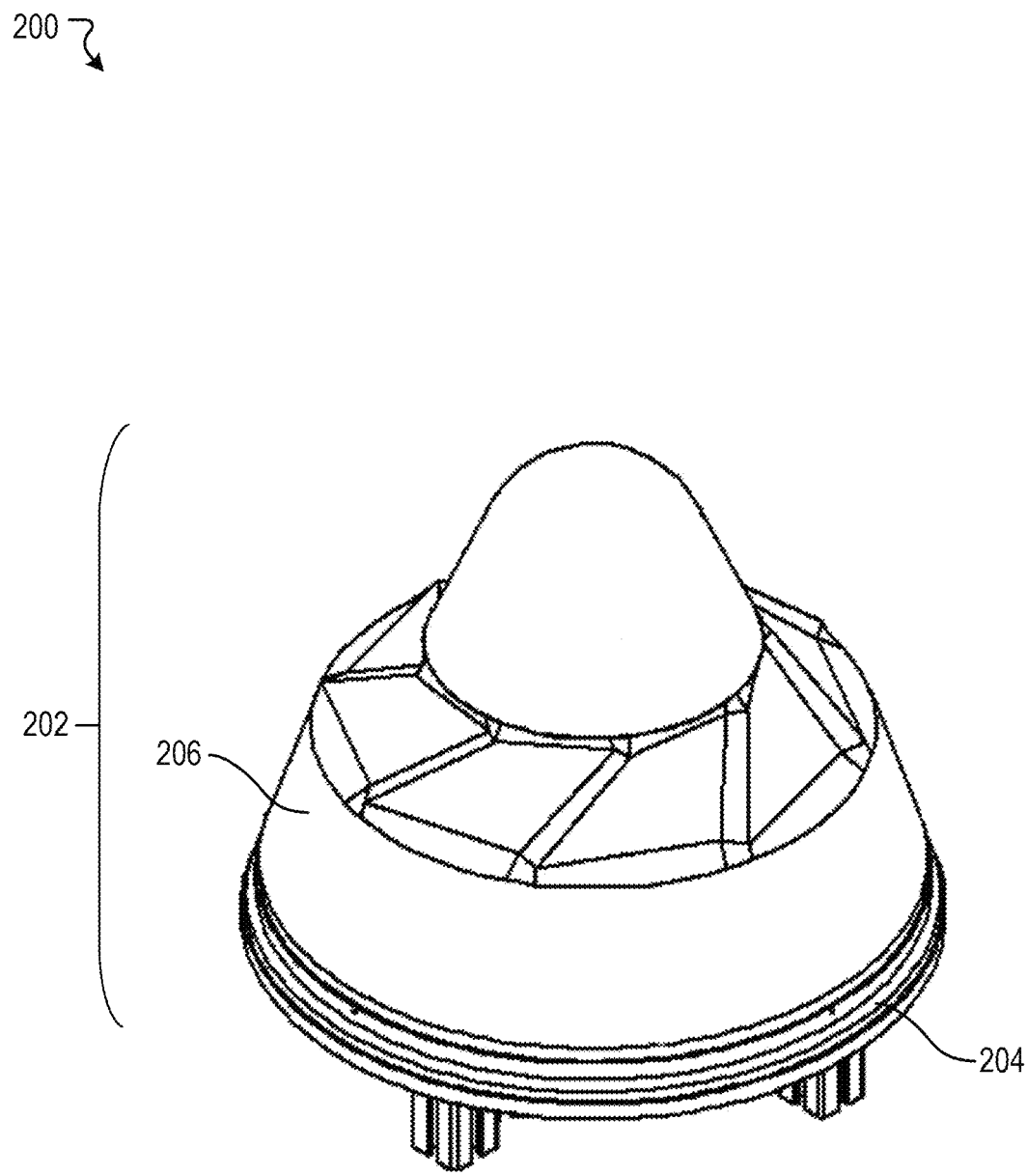
FIG. 2A illustrates an example sensor enclosure, according to an embodiment of the present disclosure.

FIG. 2A illustrates an example sensor enclosure 200, according to an embodiment of the present disclosure. In some embodiments, the sensor enclosure 142 of FIG. 1B can be implemented as the sensor enclosure 200. In various embodiments, the sensor enclosure 200 can include a cover 202 and a structure 204. The cover 202 generally is made of transparent material that allows sensors of an autonomous vehicle to operate. The sensors can be mounted to the structure 204 and be encased by the cover 202. Such sensors can include a LiDAR and cameras, for examples. In some embodiments, the cover 202 can be operatively coupled to the structure 204. For example, the cover 202 is detachable or removable from the structure 204 to allow easy access to the sensors. In some implementations, the cover 202 is rotationally fixed (e.g., unrotatable) relative to the structure 204. In this implementation, rainwater accumulated on the cover 202 can be drained away from the sensor enclosure 200 through one or more drainage holes. In another implementation, the cover 202 is rotatable around the structure 204 about a vertical axis. In this implementation, centripetal force that results from the rotation can tangentially spin-away the rainwater accumulated on the cover 202 and thereby reducing the rainwater to be drained through the drainage holes. Details of the drainage holes will be discussed in more detail herein with respect to FIGS. 3A and 3B.

The cover 202 defines an outer contour, shape, or silhouette of the sensor enclosure 200. In general, because the sensor enclosure 200 is mounted exteriorly to the autonomous vehicle, it is desirable for the cover 202 to have a shape that has low wind resistance or coefficient of drag to minimize negative impacts to fuel economy. For example, a cover 202 with an angular or circular shape is more desirable than a square or rectangular shape because the angular or circular shape generally has a lower wind resistance than the square or rectangular shape. In FIG. 2A, the cover 202 is shown to have a circular dome shape segmented by a fan-like motif in middle. Generally, the cover 202 can have any shape. In various embodiments, the cover 202 can be made from any suitable material that allows the sensors in the sensor enclosure 200 to operate. Any material used to fabricate the cover 202 must be transparent to wavelengths of light (or electro-magnetic waves) receptive to the sensors. For example, for the LiDAR to properly operate, the cover 202 must allow laser pulses emitted from the LiDAR to pass through the cover 202 to reach a target and then reflect back through the cover 202 and back to the LiDAR. Similarly, for the cameras to properly operate, the cover 202 must allow entry of visible light. In addition to being transparent to wavelengths of light, any suitable material must also be able to withstand potential impacts from roadside debris. In an implementation, the cover 202 can be made from acrylic glass (e.g., Cylux, Plexiglas, Acrylite, Lucite, Perspex, etc.). In another implementation, the cover 202 can be made from strengthen glass (e.g., Coring® Gorilla® glass). In yet another implementation, the cover 202 can be made from laminated safety glass held in place by layers of polyvinyl butyral (PVB), ethylene-vinyl acetate (EVA), or other similar chemical compounds. Many implementations are possible and contemplated.

In some embodiments, the cover 202 can be tinted with a thin-film neural filter to reduce transmittance to light entering the cover 202. For example, in an embodiment, a portion 206 of the cover 202 can be selectively tinted with the thin-film neutral filter to reduce intensity of visible light entering the portion 206. In this example, transmittance of light in other portion of the cover 202 is not affected. This configuration can be helpful, to example to alter transmittance of light as seen by the cameras while keeping transmittance of light seen by the LiDAR same (See FIGS. 2B-2C for further details). In another embodiment, the portion 206 of the cover 202 can be tinted with a thin-film graduated neural filter in which transmittance to visible light varies along an axis. In yet another embodiment, the cover 202 can be completely treated or coated with a reflective coating such that inner of the sensor enclosure 200 is not visible from an outside vantage point while still being transparent to wavelengths of light receptive to the LiDAR and the cameras inside of the sensor enclosure 200. Many variations, such as adding a polarization layer or an anti-reflective layer, are possible and contemplated.

The structure 204 provides a mechanical framework for the sensor enclosure 200. The structure 204 can provide surfaces for which the LiDAR and the cameras of the autonomous vehicle can be mounted, anchored, or installed. Details of the structure 204 will be discussed in more detail herein with respect to FIGS. 2B-2C.

Figure 2B:
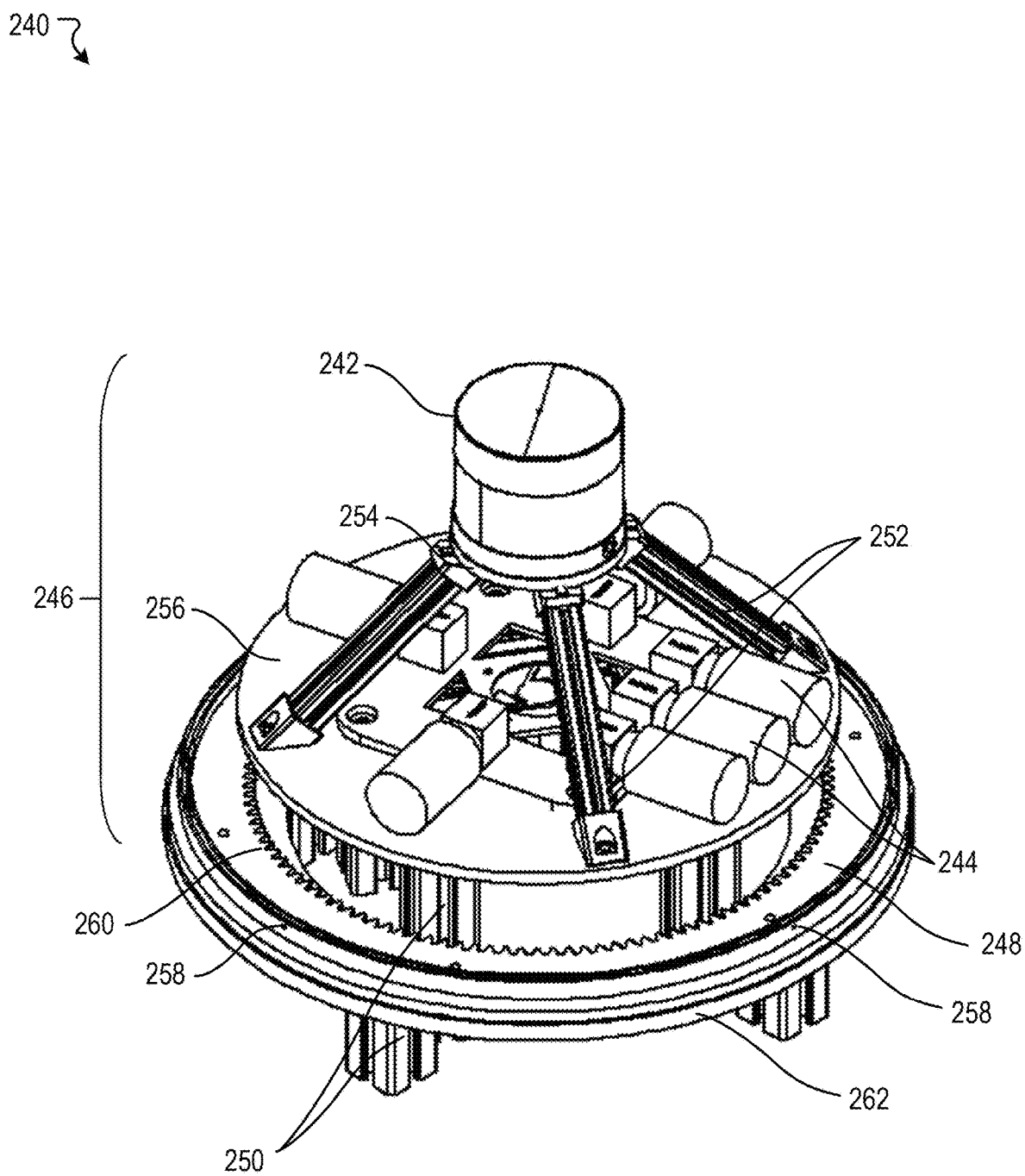
FIGS. 2B-2C illustrate an example structure, according to an embodiment of the present disclosure.
Figure 2C:
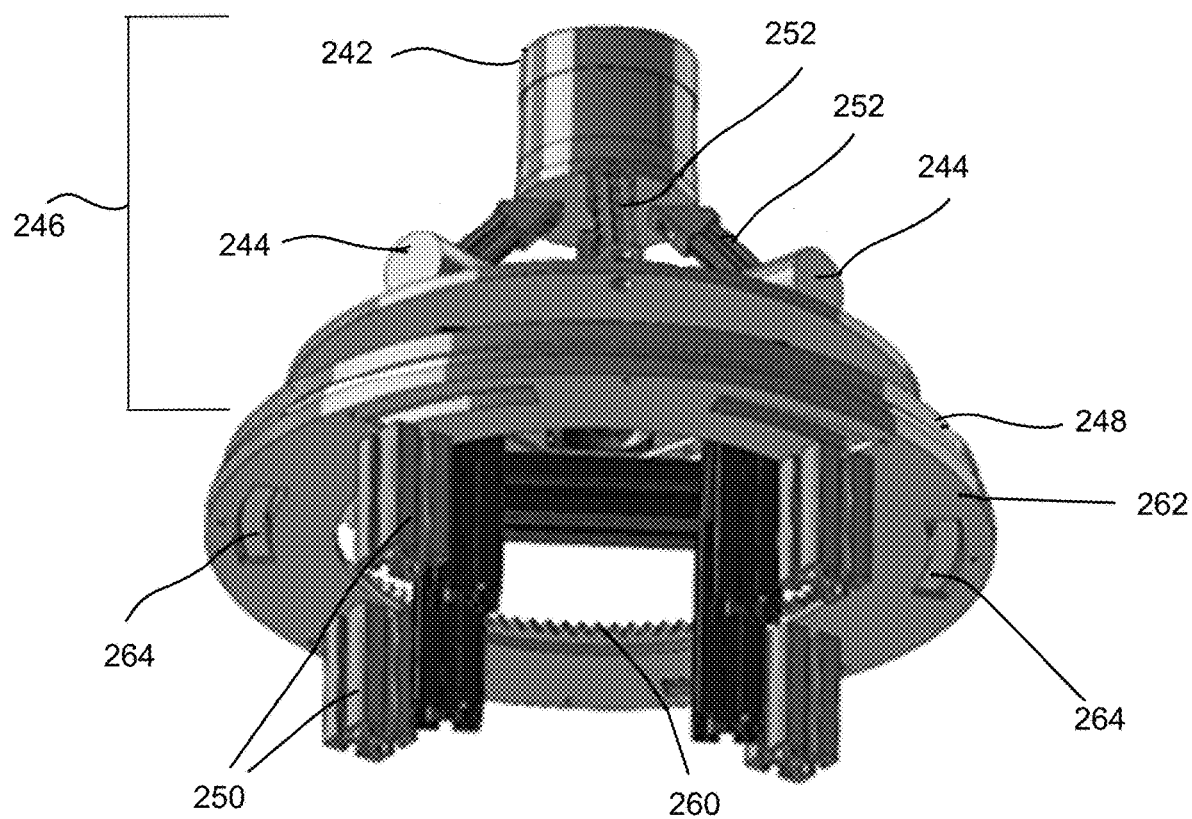

FIGS. 2B-2C illustrate an example structure 240, according to an embodiment of the present disclosure. In some embodiments, the structure 204 of FIG. 2A can be implemented as the structure 240. As shown in FIGS. 2B-2C, in various embodiments, the structure 240 provides a mechanical framework for which a LiDAR 242 and cameras 244 can be mounted, anchored, installed, or secured inside a sensor enclosure (e.g., the sensor enclosure 200 of FIG. 2A). In some embodiments, the structure 240 comprises a frame 246, a ring 248, and anchoring posts 250. The frame 246 provides mechanical support for the LiDAR 242 and the cameras 244. The ring 248 provides mounting points for a cover (e.g., the cover 202 of FIG. 2A) to encase the structure 240. The anchoring posts 250 provide mechanical couplings to secure or mount the sensor enclosure to an autonomous vehicle (e.g., the autonomous vehicle 150 of FIG. 1B).

In some embodiments, the frame 246 can have two base plates held in place by structs 252. In the example of FIG. 2B, the two base plates are held in place by four structs 252. As shown in FIG. 2B, an upper base plate 254 can provide a surface for which the LiDAR 242 can be secured, while a lower base plate 256 can provide a surface for which the cameras 244 can be secured. In some embodiments, the lower base plate 256 can include one or more anchoring post mounting points for which anchoring posts 250 can be attached. In general, any number of LiDARs and cameras can be mounted to the frame 246. The frame 246 is not limited to having one LiDAR and six cameras as depicted in FIG. 2B. For example, in an embodiment, the frame 246 can have more than two base plates held in place by the structs 252. In this example, the frame 246 may have three base plates with upper two base plates reserved for two LiDARs and a lower base plate reserved for cameras. In another embodiment, the lower base plate can have more than six cameras. For instance, there can be four cameras pointed in a forward direction of the autonomous vehicle, two cameras pointed to in a right and a left direction of the autonomous vehicle, and three cameras pointed in a backward direction of the autonomous vehicle. Many variations are possible. In general, the two base plate design of the structure 240 allows for compact packaging of the sensors that minimizes physical footprint of the sensor enclosure. Furthermore, the two base plates are circular in design which allows the cover of the sensor enclosure to have a circular dome shape. As discussed, a circular shape is generally preferable because of lower wind resistance or coefficient of drag.

In some embodiments, the frame 246 can also include a powertrain (not shown). The powertrain is an electric motor coupled to a drivetrain comprising one or more gears. The powertrain can rotate or slew the ring 248 clockwise or counter-clockwise at various rotational speeds. In some embodiments, the frame 246 can include a rainwater sensor (not shown). When the rainwater sensor detects presence of rainwater (or melted snow) on the cover, the powertrain can automatically rotate to tangentially spin-away the rainwater from the cover. In various embodiments, the electric motor can be a direct current brush or brushless motor, or an alternate current synchronous or asynchronous motor. Many variations are possible. In various embodiments, the one or more gears of the drivetrain can be configured to have various gear ratios optimized over torque delivery and rotational speed.

In general, the frame 246 can be made from any suitable materials that can withstand extreme temperature swings and weather various environmental conditions (e.g., rain, snow, corrosion, oxidation, etc.). The frame 246 can be fabricated using various metal alloys (e.g., aluminum alloys, steel alloys, etc.) or carbon graphite. The frame 246 can also be fabricated using three dimensional printers with thermoplastics (e.g., polylactic acid, acrylonitrile butadiene styrene, polyamide, high impact polystyrene, thermoplastic elastomer, etc.). Many variations are possible.

The ring 248 can provide mounting points for the cover of the sensor enclosure (e.g., the cover 202 of FIG. 2A). In various embodiments, the ring 248 is disposed peripherally to the frame 246. In the example of FIGS. 2B-2C, the ring 248 has an outer portion that includes attachment points 258 through which the cover can be attached and secured. In some embodiments, the ring 248 has an inner portion that comprises gear teeth 260 (or cogs) such that when the gear teeth 260 are driven by the powertrain of the frame 246 (not shown), the ring 248 and the cover rotate as a unit. As discussed, in some embodiments, the rotation of the cover, can cause rainwater accumulated on the cover to tangentially spin-away. In some embodiments, the ring 248 can include a drainage ring plate 262. The drainage ring plate 262 includes one or more drainage holes 264 through which the rainwater accumulated can be drained away from the sensor enclosure. Details of the drainage ring plate 262 will be discussed in more detail herein with respect to FIGS. 3A and 3B.

Similar to the frame 246, the ring 248 can be made from any suitable material that can withstand extreme temperature swings and weather various environmental conditions. However, in some implementations, the suitable material for the ring 248 can be somewhat more durable than the material used for the frame 246. This is because the gear teeth 260 are subject to more wear and tear from being coupled to the powertrain of the frame 246. In general, the ring 248 can be fabricated using various metal alloys (e.g., carbon steel, alloy steel, etc.). The ring 248 can also be fabricated using three dimensional printers with thermoplastics (e.g., polylactic acid, acrylonitrile butadiene styrene, polyamide, high impact polystyrene, thermoplastic elastomer, etc.). Many variations are possible.

The anchoring posts 250 can provide mechanical couplings to secure or mount the sensor enclosure to the autonomous vehicle. The anchoring posts are disposed beneath the frame 246 and the ring 248. In general, any number of anchoring posts 250 may be used. In the example of FIGS. 2B-2C, the structure 240 is shown with eight anchoring posts: four anchoring posts to secure the frame 246 to the autonomous vehicle and four anchoring posts to secure the ring 248 to the autonomous vehicle. Similar to the frame 246 and the ring 248, the anchoring posts 250 can be made from any suitable materials and fabricated using metal alloys (e.g., carbon steel, alloy steel, etc.) or three dimensionally printed with thermoplastics (e.g., polylactic acid, acrylonitrile butadiene styrene, polyamide, high impact polystyrene, thermoplastic elastomer, etc.).

Figure 3A:
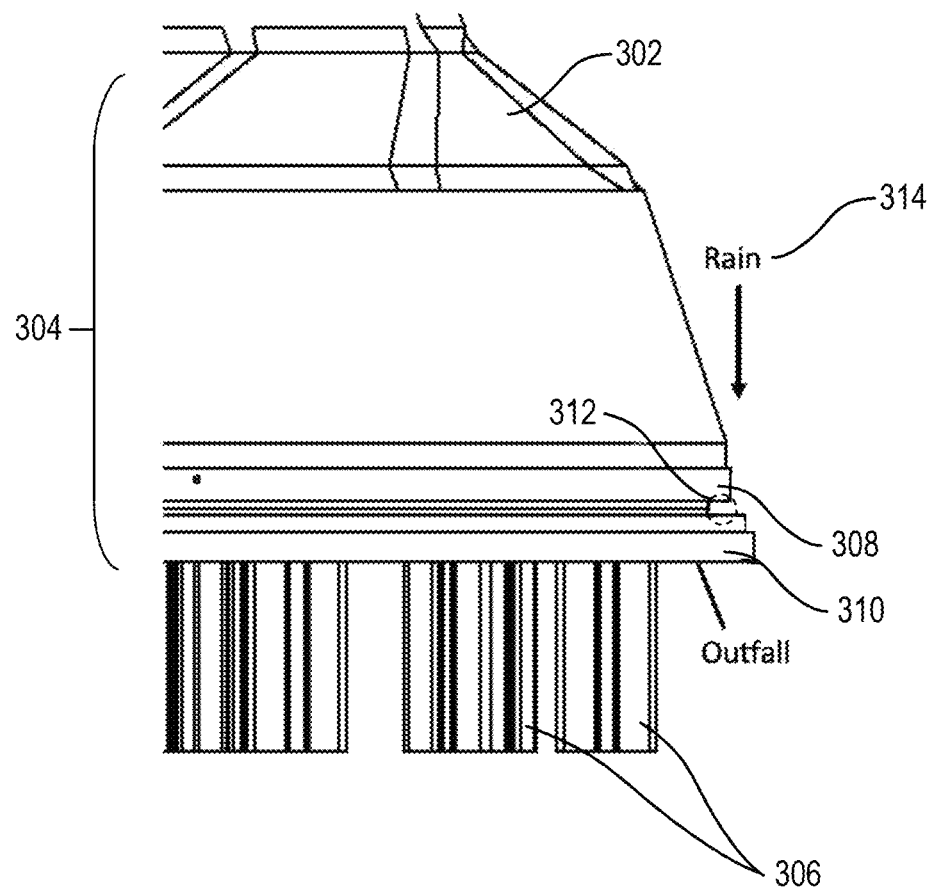
FIG. 3A illustrates a lower portion of an example sensor enclosure, according to an embodiment of the present disclosure.

FIG. 3A illustrates a lower portion of an example sensor enclosure 300, according to an embodiment of the present disclosure. In some embodiments, the sensor enclosure 200 of FIG. 2A can be implemented as the sensor enclosure 300. Similar to the sensor enclosure 200, the sensor enclosure 300 can include a cover 302, a structure 304 (note, a portion of the structure 304 covered by the cover 302 is not shown in FIG. 3A), and anchoring posts 306. In some embodiments, the structure 304 can further include a ring 308 through which the cover 302 is attached, and the ring 308 can further include a drainage ring plate 310. In the example of FIG. 3A, rainwater (e.g., rain 314) can accumulate on the cover 302 of the sensor enclosure 300 during raining or snowing weather. The rainwater can flow down from the cover 302 to the lower portion of the sensor enclosure 300. Because of various intricate moving components of the structure 304 (e.g., the ring 248, the gear teeth 260 and the powertrain of FIG. 2B-2C), there can be various crevices, such as a gap 312 as shown. The gap 312 can trap the rainwater and the rainwater can imped rotational movements of the ring 308 over time due to rusting or oxidation of the various moving components of the structure 304. Furthermore, in some cases, the rainwater can seep into the sensor enclosure 300 through the various crevices and can potentially cause water damage to sensors or other electrical components inside the sensor enclosure 300. Therefore, the trapped rainwater need to be drained away from the sensor enclosure 300. The drainage ring plate 310 is designed for such a task.

Figure 3B:
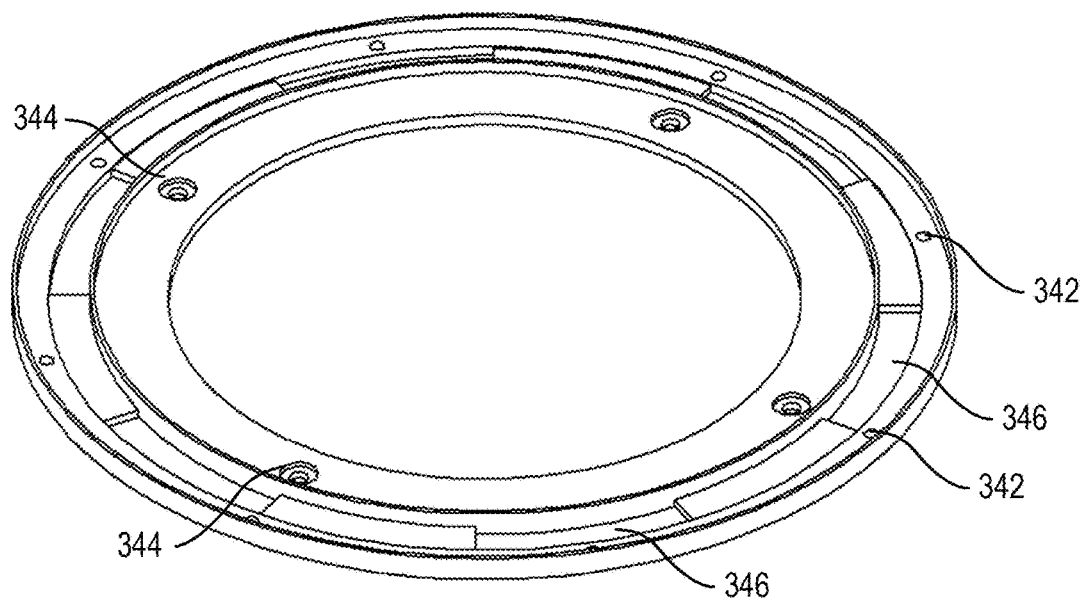
FIG. 3B illustrates an example drainage ring plate, according to an embodiment of the present disclosure.

FIG. 3B illustrates an example drainage ring plate 340, according to an embodiment of the present disclosure. In some embodiments, the drainage ring plate 310 of FIG. 3A can be implemented as the drainage ring plate 340. The drainage ring plate 340 generally has a circular ring shape can be bolted onto a ring (e.g., the ring 308 of FIG. 3A) through which a cover of an sensor enclosure (e.g., the cover 302 of FIG. 3A) can be attached. As shown in FIG. 3B, the drainage ring plate 340 can include one or more mounting points 342, one or more anchoring post mounting points 344, and one or more drainage holes 346. In general, the one or more mounting points 342, the one or more anchoring post mounting points 344, and the one or more drainage holes 346 are disposed circularly around the drainage ring plate 340. The one or more mounting points 342 are used to attach or bolt the drainage ring plate 340 to the ring. The one or more anchoring post mounting points 344 are used to attach anchoring posts (e.g., the anchoring posts 250 of FIGS. 2B-2C) to the ring. The one or more drainage holes 346 are openings in the drainage ring plate 340 through which rainwater (or melted snow) can be drained away. For example, the rainwater accumulated on the cover can flow down from the cover to crevices of a structure that the ring is a part of (e.g., the structure 304 of FIG. 3A). The rainwater is then drained away from the sensor enclosure, through the crevices, via the one or more drainage holes 346. This drainage prevents the rainwater from being trapped in the cervices and prevents the rainwater from seeping into the sensor enclosure.

Figure 4:
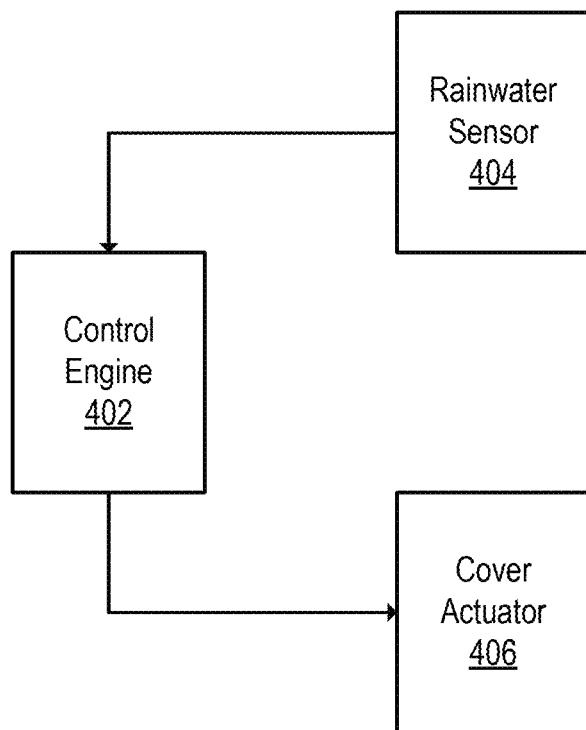
FIG. 4 illustrates an example control diagram, according to an embodiment of the present disclosure.

FIG. 4 illustrate an example control diagram 400, according to an embodiment of the present disclosure. In some embodiments, the control diagram 400 can include a control engine 402, a rainwater sensor 404, and a cover actuator 406. The control engine 402 can be configured to control speed at which a cover (e.g., the cover 202 of FIG. 2A or the cover 302 of FIG. 3A) of a sensor enclosure (e.g., the sensor enclosure 200 of FIG. 2A or the sensor enclosure 300 of FIG. 3A) rotates through the cover actuator 408 (e.g., the powertrain of the frame 246 of FIG. 2B). In various embodiments, the control engine 402 can detect a presence of rainwater on the cover at a predetermined timeframe or at a certain sampling rate. For example, the control engine 402 can receive readings from the rainwater sensor 404 every second, every thirty seconds, every minute, every five minutes, etc. Once rainwater is detected, the control engine 402 may decide to rotate the cover to tangentially spin-away the rainwater from the cover through the cover actuator 406. In some cases, if more rainwater is detected, the control engine 402 may speed up the rotation to tangentially spin-away as much rainwater as possible. In general, the control engine 402 can be implemented with any suitable control algorithms or controllers. For example, in an embodiment, the control engine 402 can be implemented as a feed-back control. In some embodiments, the control engine 402 can be implemented as a feed-back control with a feed-forward loop. In some embodiments, the control engine 402 can be implemented as a bang-bang control. Many variations are possible.

Figure 5:
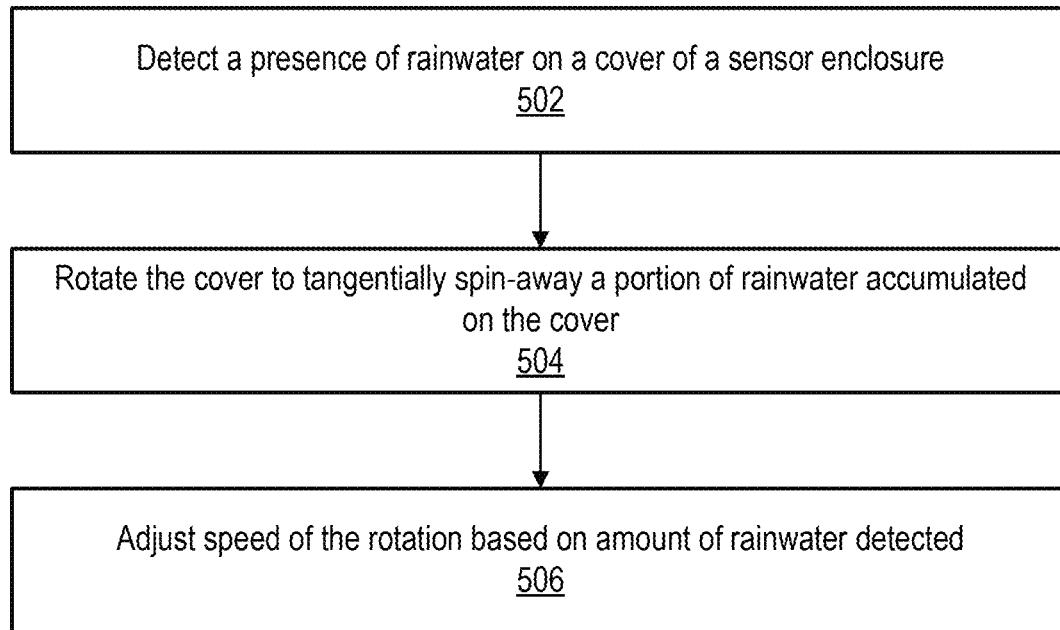
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can detect a presence of rainwater on a cover of a sensor enclosure. At block 504, the example method 500 can rotate the cover to tangentially spin-away a portion of rainwater accumulated on the cover. At block 506, the example method 500 can adjust speed of the rotation based on amount of rainwater detected.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
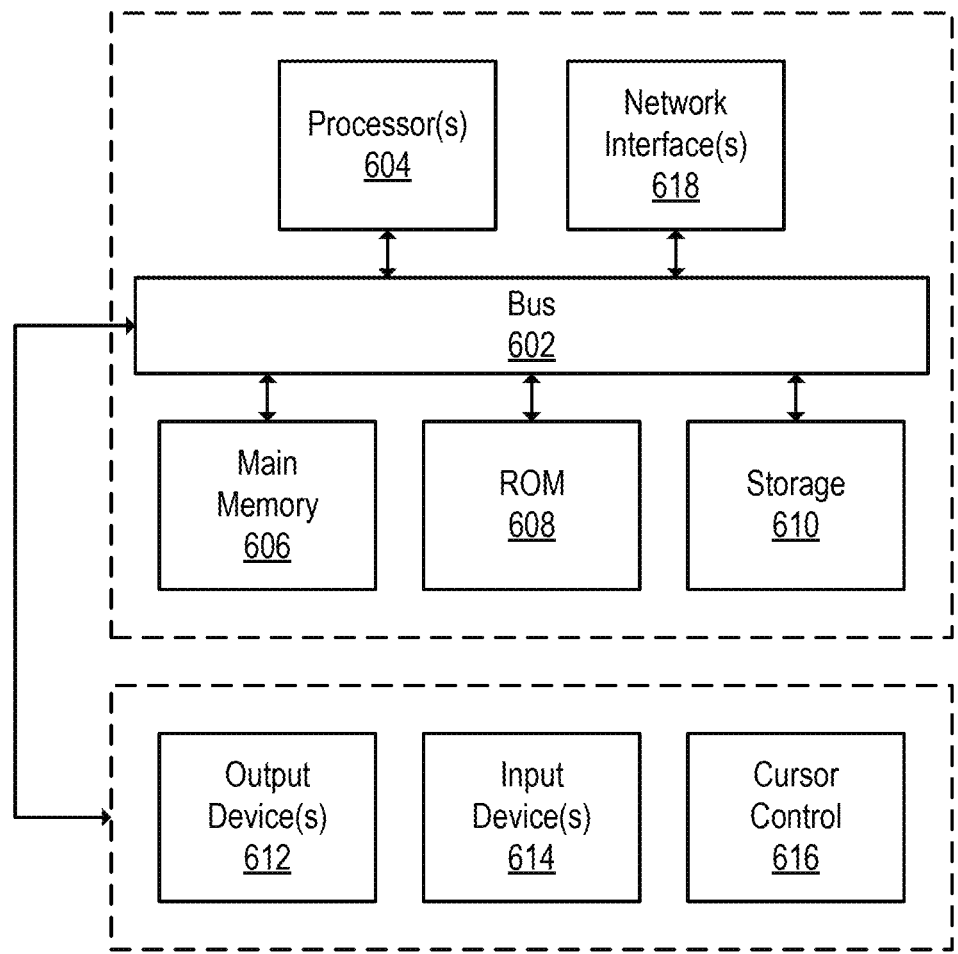
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information.

Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A sensor enclosure comprising:
   a drainage ring plate with an outer portion affixed to a ring that is operatively coupled to a cover of the sensor enclosure, the drainage ring plate including one or more drainage holes through which rainwater accumulated on the cover can be drained away, wherein, if the one or more drainage holes comprise a plurality of drainage holes, the plurality of drainage holes are disposed circularly with respect to the outer portion and have equal arc length;
   a frame on which one or more sensors associated with the sensor enclosure are mounted;
   the ring disposed peripherally to the frame; and
   a plurality of anchoring posts, disposed underneath the frame and the ring, to anchor the sensor enclosure to a vehicle.

2. The sensor enclosure of claim 1, wherein the outer portion has a circular shape.

3. The sensor enclosure of claim 1, wherein the drainage holes are disposed concentrically with respect to the outer portion.

4. The sensor enclosure of claim 1, wherein the cover has a circular dome shape segmented by a fan-like motif in middle.

5. The sensor enclosure of claim 1, wherein the cover comprises one or more portions that are tinted.

6. The sensor enclosure of claim 1, wherein the plurality of anchoring posts comprises a first set of anchoring posts and a second set of anchoring posts.

7. The sensor enclosure of claim 1, wherein the first set of anchoring posts is disposed underneath the frame and the second set of anchoring posts is disposed underneath the ring.

8. The sensor enclosure of claim 1, wherein the drainage ring plate further includes a plurality of anchoring post mounting points and a plurality of mounting points.

9. The sensor enclosure of claim 8, wherein the plurality of anchoring post mounting points and the plurality of mounting points are disposed circularly with respect to the outer portion.

10. The sensor enclosure of claim 8, wherein the drainage holes are disposed between the plurality of anchoring post mounting points and the plurality of mounting points on the drainage ring plate.

11. The sensor enclosure of claim 1, wherein the frame comprises:
    a circular upper base plate;
    a circular lower base plate; and
    a plurality of struts connecting the circular upper base plate and the circular lower base plate.

12. The sensor enclosure of claim 11, wherein the circular upper base plate includes at least one LiDAR.

13. The sensor enclosure of claim 11, wherein the circular lower base plate includes at least one camera.

14. The sensor enclosure of claim 1, wherein the frame further comprises:
    a rainwater sensor configured to detect a presence of rainwater on the cover; and
    a powertrain configured to rotate the ring and the cover coupled to the ring upon detection of the presence of rainwater.

15. The sensor enclosure of claim 14, wherein the powertrain rotates the cover to tangentially spin-away a portion of the rainwater accumulated on the cover.

16. The sensor enclosure of claim 14, wherein the powertrain comprises an electric motor coupled to a drivetrain.

17. The sensor enclosure of claim 16, wherein the drivetrain comprises one or more gears.

18. The sensor enclosure of claim 1, wherein the cover is transparent to wavelengths of light receptive to the one or more sensors of the sensor enclosure.

19. The sensor enclosure of claim 18, wherein the cover is made of at least one of acrylic glass, strengthened glass, or safety glass.

20. A sensor enclosure comprising:
- a drainage ring plate with an outer portion affixed to a ring that is operatively coupled to a cover of the sensor enclosure, the drainage ring plate including one or more drainage holes through which rainwater accumulated on the cover can be drained away, wherein, if the one or more drainage holes comprise a plurality of drainage holes, the plurality of drainage holes are disposed circularly with respect to the outer portion and have equal arc length;
- a frame on which one or more sensors associated with the sensor enclosure are mounted, wherein the frame comprises:
- a circular upper base plate;
- a circular lower base plate; and
- a plurality of struts connecting the circular upper base plate and the circular lower base plate.

* * * * *